US010885226B1

United States Patent
Joshi et al.

(10) Patent No.: US 10,885,226 B1
(45) Date of Patent: Jan. 5, 2021

(54) SYSTEMS AND METHODS FOR ENFORCING SECURE SHARED ACCESS ON COMPUTING DEVICES BY CONTENT STATE PINNING

(71) Applicant: Symantec Corporation, Mountain View, CA (US)

(72) Inventors: Anuradha Joshi, Bibwewadi (IN); Pallavi Rajput, Wakad (IN); Anand Darak, Dhayari (IN)

(73) Assignee: NORTONLIFELOCK, INC., Tempe, AZ (US)

( * ) Notice: Subject to any disclaimer, the term of this patent is extended or adjusted under 35 U.S.C. 154(b) by 267 days.

(21) Appl. No.: 16/000,924

(22) Filed: Jun. 6, 2018

(51) Int. Cl.
*G06F 21/00* (2013.01)
*G06F 21/62* (2013.01)
*G06F 21/55* (2013.01)
*G06F 21/31* (2013.01)

(52) U.S. Cl.
CPC ............ *G06F 21/629* (2013.01); *G06F 21/31* (2013.01); *G06F 21/554* (2013.01)

(58) Field of Classification Search
CPC ....... G06F 21/629; G06F 21/554; G06F 21/31
See application file for complete search history.

(56) References Cited

U.S. PATENT DOCUMENTS

| | | | | |
|---|---|---|---|---|
| 2013/0303143 A1* | 11/2013 | Schrader | ............... | H04W 8/183 455/418 |
| 2013/0305354 A1* | 11/2013 | King | ................... | G06F 21/6281 726/19 |
| 2013/0311291 A1* | 11/2013 | Ward | ................. | G06Q 30/0264 705/14.58 |
| 2014/0053182 A1* | 2/2014 | Jaager | .................. | H04N 21/632 725/25 |
| 2014/0068755 A1* | 3/2014 | King | ........................ | G06F 21/53 726/19 |
| 2014/0163774 A1* | 6/2014 | Demeniuk | .............. | H04L 67/12 701/2 |
| 2014/0164776 A1* | 6/2014 | Hook | .................. | G06F 21/6218 713/171 |
| 2015/0012827 A1* | 1/2015 | Elmeih | ............... | A63F 13/5258 715/719 |

(Continued)

OTHER PUBLICATIONS

Buennenneyer et al., "Mobile Device Profiling and Intrusion Detection Using Smart Batteries", Proceedings of the 41st Annual Hawaii International Conference on System Sciences (HICSS), Date of Conference: Jan. 7-10 (Year: 2008).*

*Primary Examiner* — Morshed Mehedi
(74) *Attorney, Agent, or Firm* — FisherBroyles, LLP (57) ABSTRACT

The disclosed computer-implemented method for enforcing secure shared access on computing devices by content state pinning may include (1) receiving, from a user, a selection of a content view to be shared with an additional user from content displayed on a computing device by an application, (2) associating, by the computing device, a change event with the content view, (3) detecting, by the computing device, the change event in response to an action by the additional user to change the content view, and (4) performing, by the computing device, a security action to protect the computing device from potentially malicious activity associated with the action by the additional user to change the content view. Various other methods, systems, and computer-readable media are also disclosed.

20 Claims, 7 Drawing Sheets

(56) References Cited

U.S. PATENT DOCUMENTS

| | | | |
|---|---|---|---|
| 2015/0101047 A1* | 4/2015 | Sridhara | H04L 63/1433 |
| | | | 726/23 |
| 2017/0093769 A1* | 3/2017 | Lind | G09G 5/377 |
| 2017/0104807 A1* | 4/2017 | Braun | H04L 67/125 |
| 2017/0140658 A1* | 5/2017 | Aluvala | H04W 12/00502 |
| 2017/0185254 A1* | 6/2017 | Zeng | H04L 65/4015 |
| 2018/0032997 A1* | 2/2018 | Gordon | G06Q 30/0269 |
| 2019/0281010 A1* | 9/2019 | Teverovsky | H04L 63/1416 |

* cited by examiner

SYSTEMS AND METHODS FOR ENFORCING SECURE SHARED ACCESS ON COMPUTING DEVICES BY CONTENT STATE PINNING

BACKGROUND

In many enterprise and consumer environments, users of computing devices (e.g., mobile computing devices) may wish to share displayed selected content by handing over their devices to other users. Unfortunately, the sharing of computing devices with others presents several drawbacks, such as the risk of providing unintended access to sensitive content (e.g., emails containing confidential company information, personal photographs, etc.) when another user navigates away from the displayed selected content on the device.

Traditional solutions may restrict users from navigating to other applications on a computing device by utilizing "screen pinning." For example, a user A may desire to share their device with a user B to view an email. User A may share their device using a screen pinning feature, which would prevent user B from navigating to other applications on that device. However, user B would still be able to utilize the currently used email application to view other emails as well as perform some action on them within the email application such as forwarding, deleting, etc. Thus, traditional solutions may fail to prevent users from navigating to other parts of an application when sharing content on a user device, thereby triggering unintended information access.

SUMMARY

As will be described in greater detail below, the instant disclosure describes various systems and methods for enforcing secure shared access on computing devices by content state pinning.

In one example, a method for enforcing secure shared access on computing devices by content state pinning may include (1) receiving, from a user, a selection of a content view to be shared with an additional user from content displayed on a computing device by an application, (2) associating, by the computing device, a change event with the content view, (3) detecting, by the computing device, the change event in response to an action by the additional user to change the content view, and (4) performing, by the computing device, a security action to protect the computing device from potentially malicious activity associated with the action by the additional user to change the content view.

In one example, the selection of the content view to be shared may precede a handover of the computing device from the user to the additional user. In one example, the change event may be associated with the application displaying the content on the computing device.

In some examples, the change event may be detected in response to an attempt by the additional user to navigate away from the content view on the computing device. For example, a command may be detected to view additional content, outside of the content view, associated with the application. Additionally, or alternatively, a command may be detected to access an additional application on the computing device.

In one example, the security action may include (1) generating a security notification on the computing device and (2) requesting a security authorization to allow the action by the additional user to change the content view on the computing device.

In one embodiment, a system for enforcing secure shared access on computing devices by content state pinning may include several modules stored in memory, including (1) a receiving module, stored in the memory, that receives, from a user, a selection of a content view to be shared with an additional user from content displayed on a computing device by an application, (2) an association module, stored in the memory, that associates a change event with the content view, (3) a detection module, stored in the memory, that detects the change event in response to an action by the additional user to change the content view, (4) a security module, stored in the memory, that performs a security action to protect the computing device from potentially malicious activity associated with the action by the additional user to change the content view, and (5) at least one physical processor that executes the receiving module, the association module, the detection module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from a user, a selection of a content view to be shared with an additional user from content displayed on the computing device by an application, (2) associate a change event with the content view, (3) detect the change event in response to an action by the additional user to change the content view, and (4) perform a security action to protect the computing device from potentially malicious activity associated with the action by the additional user to change the content view.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enforcing secure shared access on computing devices by content state pinning. As will be explained in greater detail below, by associating a change event with a content view displayed on a computing device, prior to handover of the computing device to an additional user, the systems and methods described herein may allow a user to "pin" or lock the content view on the computing device and request authorization upon an attempt by the additional user to navigate away from the content view, thereby protecting the computing device from potentially malicious activity.

In addition, the systems and methods described herein may improve the functioning of a computing device and/or the technical field of computer device security, by preventing potentially malicious activity that may compromise the operation of the computing device. For example, the systems and methods described herein may prevent a user with whom a computing device has been shared from navigating away from an email message displayed in a pinned content view and utilize the sharing user's email application to access and open a suspicious email message intended to install malware for damaging or disabling the sharing user's device.

Figure 1:
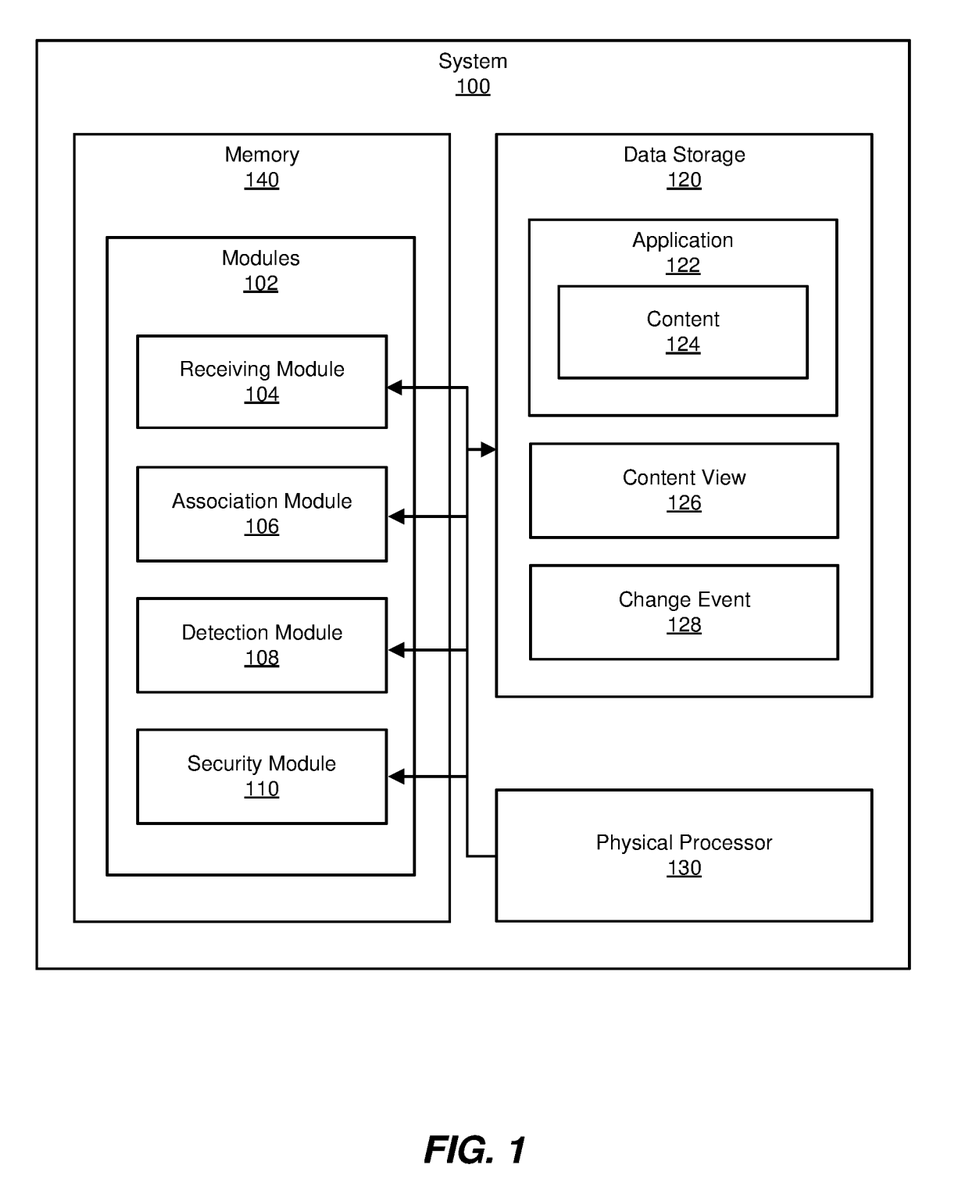
FIG. 1 is a block diagram of an example system for enforcing secure shared access on computing devices by content state pinning.
Figure 2:
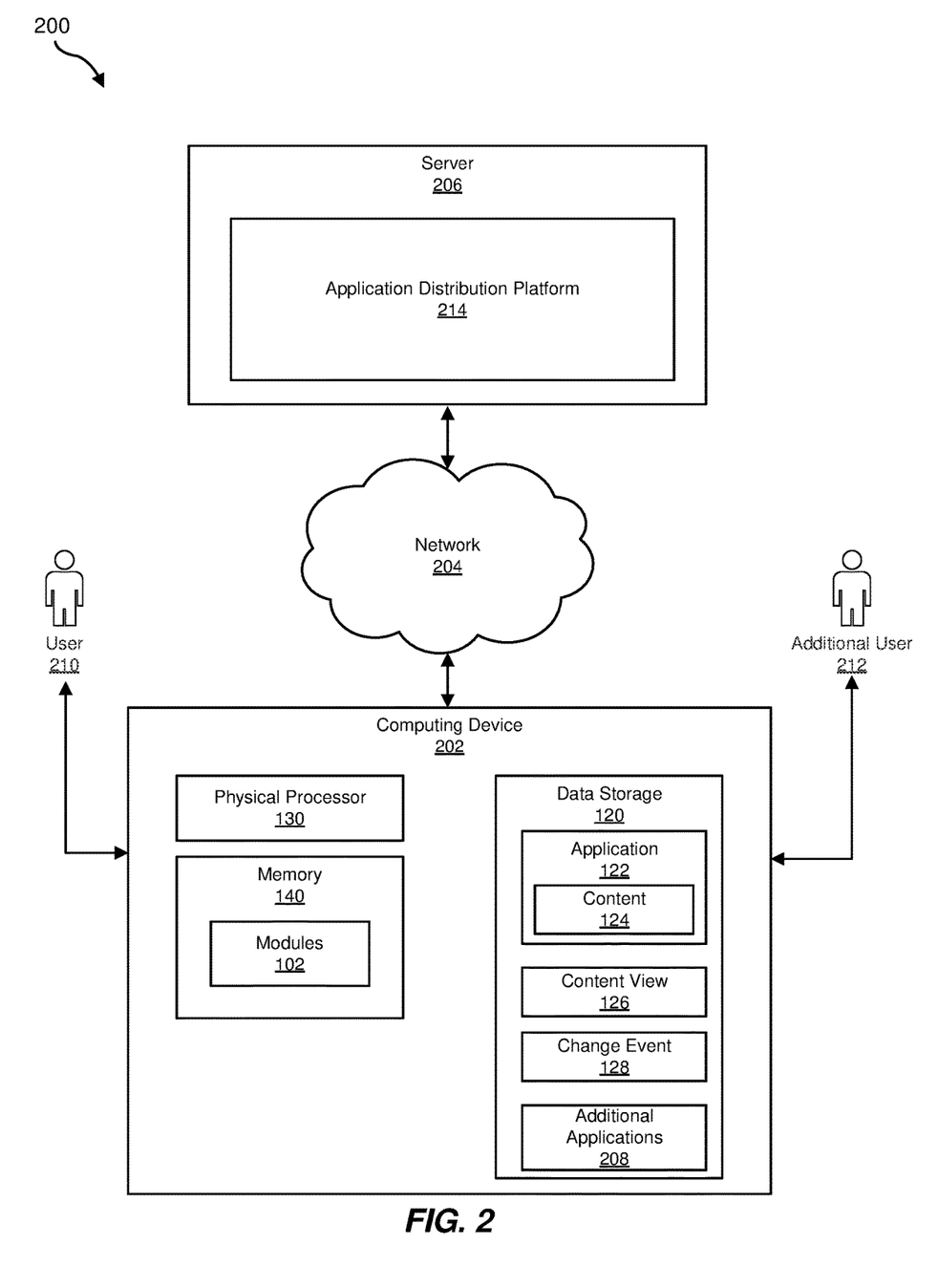
FIG. 2 is a block diagram of an additional example system for enforcing secure shared access on computing devices by content state pinning.

The following will provide, with reference to FIGS. 1-2, detailed descriptions of example systems for enforcing secure shared access on computing devices by content state pinning. Detailed descriptions of corresponding computer-implemented methods will also be provided in connection with FIG. 3. A detailed description of example actions that may be taken by the example system for enforcing secure shared access on a computing device by content state pinning will also be provided in connection with FIG. 4. A detailed description of an example user interface that may be generated by the example system for enforcing secure shared access on a computing device by content state pinning, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for enforcing secure shared access on computing devices by content state pinning. As illustrated in this figure, example system 100 may include one or more modules 102 for performing one or more tasks. As will be explained in greater detail below, modules 102 may include a receiving module 104 that may receive a selection of a content view 126 to be shared with an additional user from content 124 displayed on a computing device by an application 122, an association module 106 that may associate a change event 128 with content view 126, a detection module 108 that may detect change event 128 in response to an action by the additional user to change content view 126, and a security module 110 that may perform a security action to protect the computing device from potentially malicious activity associated with the action by the additional user to change content view 126. Although illustrated as separate elements, one or more of modules 102 in FIG. 1 may represent portions of a single module or application.

The term "content view," as used herein, generally refers to a user-specified (e.g., specific) view of content generated by an application that is displayed on a user's computing device. For example, a content view may include an email message (or a portion thereof) displayed on a user's computing device, and which the user wishes to share with another party, selected from a folder generated by an email application. In some examples, upon selecting a content view, other content generated by the application on the user's computing device (e.g., a view of other emails and/or email folders generated for display by an email application) may not be visible on the computing device's display.

The term "change event," as used herein, generally refers to an action (e.g., a service event) detected by a software service configured to monitor any change with respect to an application executing a computing device. For example, a change event may include a window content change event service that detects an attempt by a user to close an application executing on a computing device (e.g., for the purpose of opening another application). Additionally or alternatively, a change event may include a window content change event service that detects an attempt by a user to execute an application command (e.g., forwarding an email) while viewing content on a computing device.

The term "pinned content," as used herein, generally refers to a content view that has been selected by a user for display on a computing device for which inter application navigation, intra application navigation, and/or other application operation is restricted without authorization following the detection of a change event.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing secure shared access on computing devices by content state pinning. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120. Data storage 120 generally represents any type or form of computing device capable of data storage. In one example, data storage 120 may store application 122, content 124, content view 126, and change event 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to enforce secure shared access by content state pinning. For example, and as will be described in greater detail below, one or more of modules 102 may cause computing device 202 to (1) receive, from user 210, a selection of content view 126 to be shared with additional user 212 from content 124 displayed on computing device 202 by application 122, (2) associate change event 128 with content view 126, (3) detect change event 128 in response to an action by additional user 212 to change content view 126, and (4) perform a security action to protect computing device 202 from potentially malicious activity associated with the action by additional user 212 to change content view 126.

Computing device 202 generally represents any type or form of computing device capable of reading computer-executable instructions. For example, computing device 202 may include an endpoint device (e.g., a mobile computing device) running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In one example, server 206 may be an application server hosting an application distribution platform 214 for distributing applications 122 and/or additional applications 208 to computing device 202. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
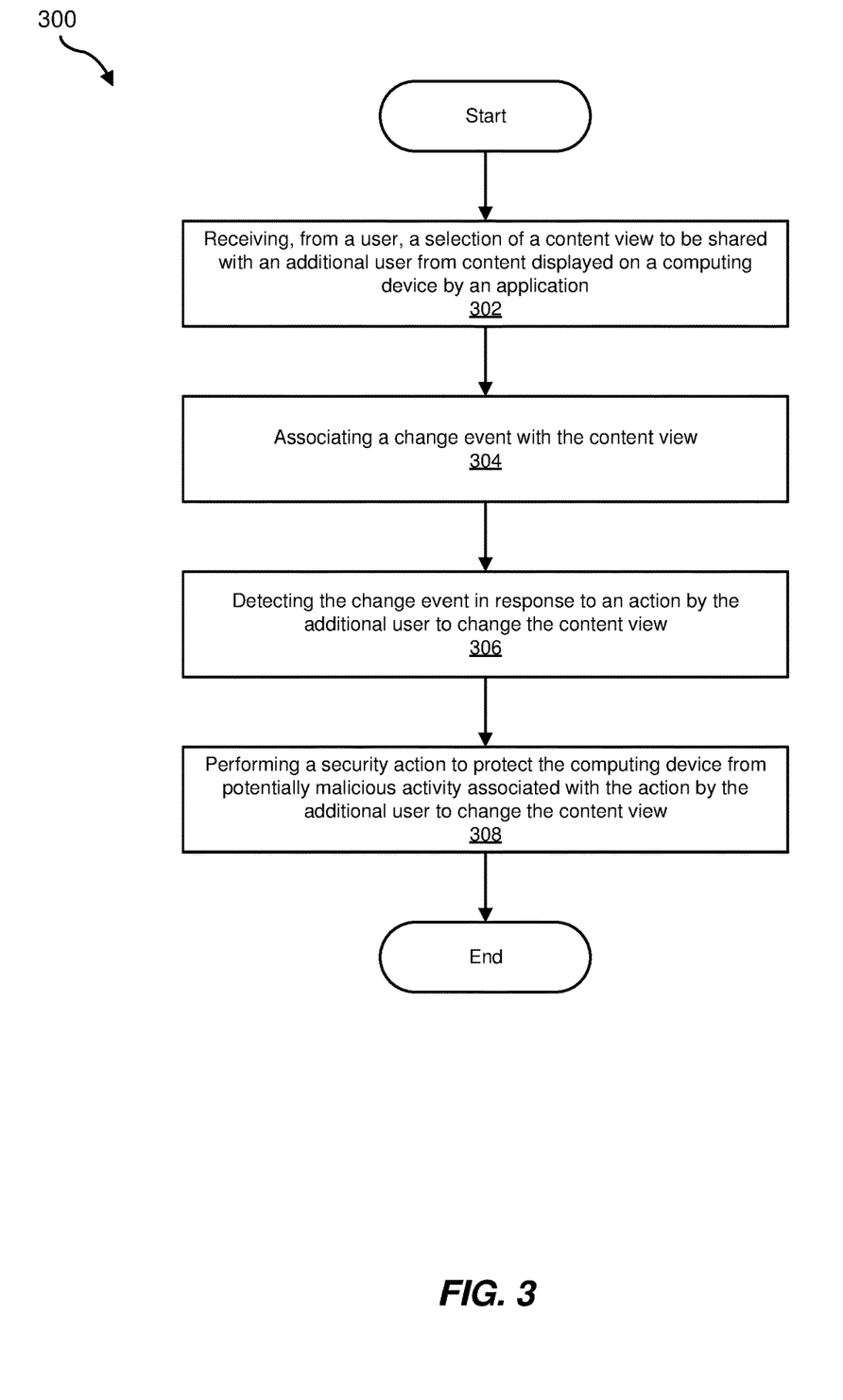
FIG. 3 is a flow diagram of an example method for enforcing secure shared access on computing devices by content state pinning.

FIG. 3 is a flow diagram of an example computer-implemented method 300 for enforcing secure shared access on computing devices by content state pinning. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receiving, from a user, a selection of a content view to be shared with an additional user from content displayed on a computing device by an application. For example, receiving module 104 may, as part of computing device 202 in FIG. 2, receive, from user 210, a selection of content view 126 to be shared with additional user 212 from content 124 displayed on computing device 202 by application 122.

Receiving module 104 may receive content view 126 in a variety of ways. In one example, receiving module 104 may receive the selection of content view 126 by user 210 to be shared with additional user 212, preceding a handover of computing device 202 from user 210 to additional user 212. For example, user 210, using an email application on computing device 202, may select content view 126 by opening an email message that user 210 wishes additional user 212 to view and then physically handover computing device 202 so that additional user 212 may view the message.

At step 304, one or more of the systems described herein may associate a change event with the content view selected at step 302. For example, association module 106 may, as part of computing device 202 in FIG. 2, associate change event 128 with content view 126. In some examples, change event 128 may include a windows content change event service generated by a mobile device operating system (e.g., the ANDROID mobile device operating system), for detecting one or more actions (such as changing content view 126) made by additional user 212 on computing device 202.

Association module 106 may associate change event 128 with content view 126 in a variety of ways. In one example, association module 106 may associate change event 128 with application 122 displaying the content 124 on computing device 202. In some examples, association module 106 may associate change event 128 in response to a command by user 210 to pin content view 126 in the application 122 prior to sharing computing device 202 with additional user 212. In one example, user 210 may initiate the command to pin content view 126 by selecting a user interface element (e.g., a floating widget) generated by association module 106

At step 306, one or more of the systems described herein may detect the change event in response to an action by the additional user to change the content view. For example, detection module 108 may, as part of computing device 202 in FIG. 2, detect change event 128 in response to an action by additional user 212 to change content view 126.

Detection module 108 may detect change event 128 in a variety of ways. In some examples, detection module 108 may detect an attempt (e.g., by utilizing a windows content change event service) by additional user 212 to navigate away from content view 126. For example, detection module 108 may detect a command by additional user 212 to view content 124, outside of content view 126. As a non-limiting example, content view 126 may include an email message selected for sharing by user 210 and additional user 212 may select a command from a menu associated with application 122 to close the email message to view a mailbox including emails containing sensitive information intended to only be viewed by 210. Additionally or alternatively, detection module 108 may detect a command to perform an operation (e.g., forwarding or deleting an email message) associated with content view 126. Additionally or alternatively, detection module 108 may detect a command to access an additional application 208 on computing device 202. As a non-limiting example, additional user 212 may initiate a command to switch from an application window displaying content view 126 to a window associated with an additional application 208 that may be executing on computing device 202.

At step 308, one or more of the systems described herein may perform a security action to protect the computing device from potentially malicious activity associated with the action by the additional user to change the content view. For example, security module 110 may, as part of computing device 202 in FIG. 2, perform a security action to protect computing device 202 from potentially malicious activity associated with the action by additional user 212 to change content view 126.

Security module 110 may perform the security action in a variety of ways. For example, security module 110 may generate a security notification on computing device 202 and then request a security authorization to allow the action by additional user 212 to change content view 126. If the requested security authorization is not received from additional user 212, then the action by additional user 212 to change content view 126 will not be allowed. Thus, in this example, any attempt by additional user 212 to navigate away from content view 126 on computing device 202 would be prevented, thereby ensuring that sensitive information associated with user 210 on computing device 202 would not be accessed.

Figure 4:
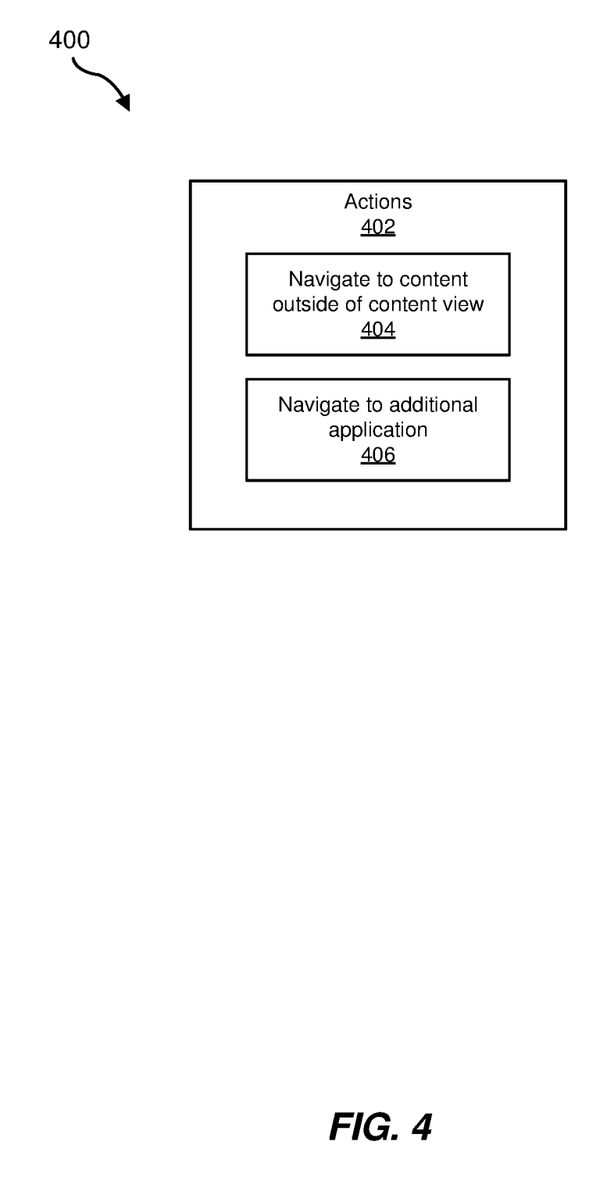
FIG. 4 is a block diagram of example actions that may be taken by an example system for enforcing secure shared access on a computing device by content state pinning.

FIG. 4 is a block diagram 400 of example actions that may be taken by an example system for enforcing secure shared access on a computing device by content state pinning. For example, the actions may include various actions 402 that may be performed by additional user 212 in attempt to navigate away from content view 126 selected for sharing by user 210.

In one example, and as discussed above with respect to step 306 in FIG. 3, actions 402 may include a command 404 by additional user 212 to navigate to content outside of content view 126 displayed on computing device 202. In another example, and as discussed above with respect to step 306 in FIG. 3, actions 402 may include a command 406 by additional user 212 to navigate to an additional application 208 on computing device 202.

Figure 5:
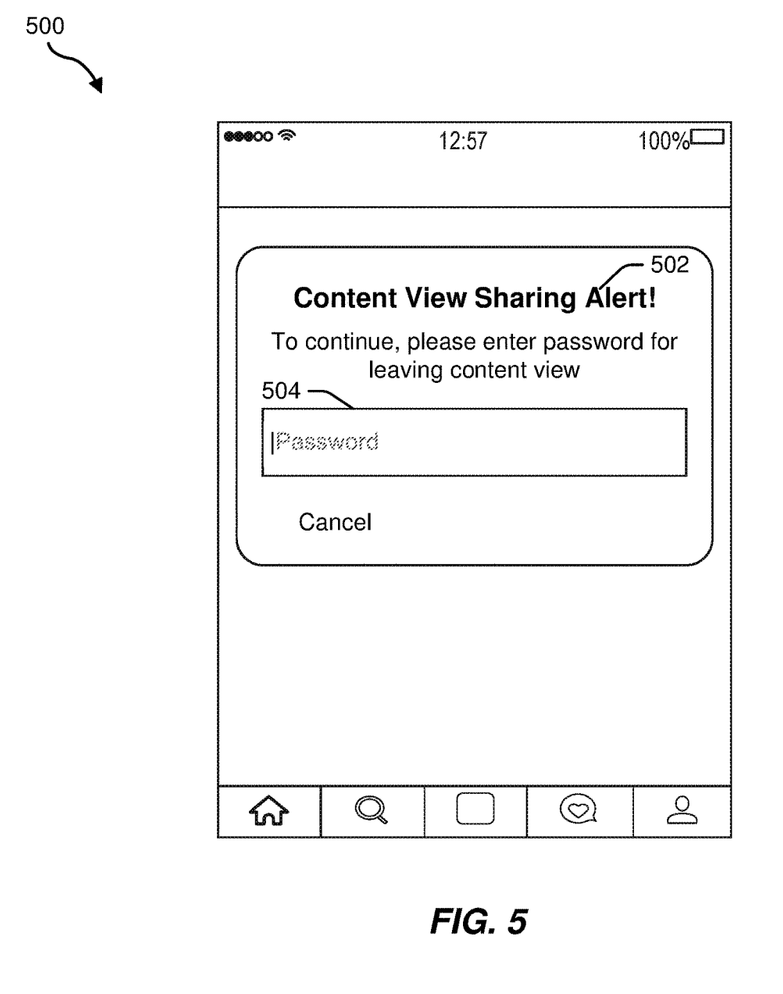
FIG. 5 is a block diagram of an example user interface that may be generated by the example system for enforcing secure shared access on a computing device by content state pinning.

FIG. 5 is a block diagram of an example user interface 500 that may be generated by the example system for enforcing secure shared access on a computing device by content state pinning. In one example, user interface 500 may be generated by security module 110 as part of computing device 202 in FIG. 2.

In some examples, and as discussed above with respect to step 308 in FIG. 3, user interface 500 may display a security notification 502 after an action is made by additional user 212 to change content view 126 shared by user 210 on computing device 202. Additionally, user interface 500 may display a security authorization box 504 requesting a security authorization (e.g., a password) to allow the action by additional user 212 to change content view 126 on computing device 202.

As described in connection with method 300 above, the systems and methods described herein may utilize content state pinning to manage view access of shared content on a computing device. In some examples, the systems described herein may be embedded into a mobile device operating system (such as the ANDROID mobile operating system). Once the systems described herein receive a request from a user to share content (e.g., via a mobile device handover) with other users, the systems described herein may provide a user selectable option (e.g., a floating widget) to pin the content to be shared on a display screen of the user's device such that when the user's device is shared with the pinned content, the person with whom the device is shared, will only be able to view the pinned content. The systems described herein may then listen for a window content change event to detect any attempts for inter and/or intra application navigation (or other operation) away from the pinned content by the person with whom the device is shared. The systems described herein may then prompt the person with whom the device is shared for authorization to prevent unintended information access on the user's device. By enabling the content state pinning with respect to shared content on a user's device, the systems and methods described herein may prevent unintended data sharing and/or manipulation when a computing device is physically shared.

Figure 6:
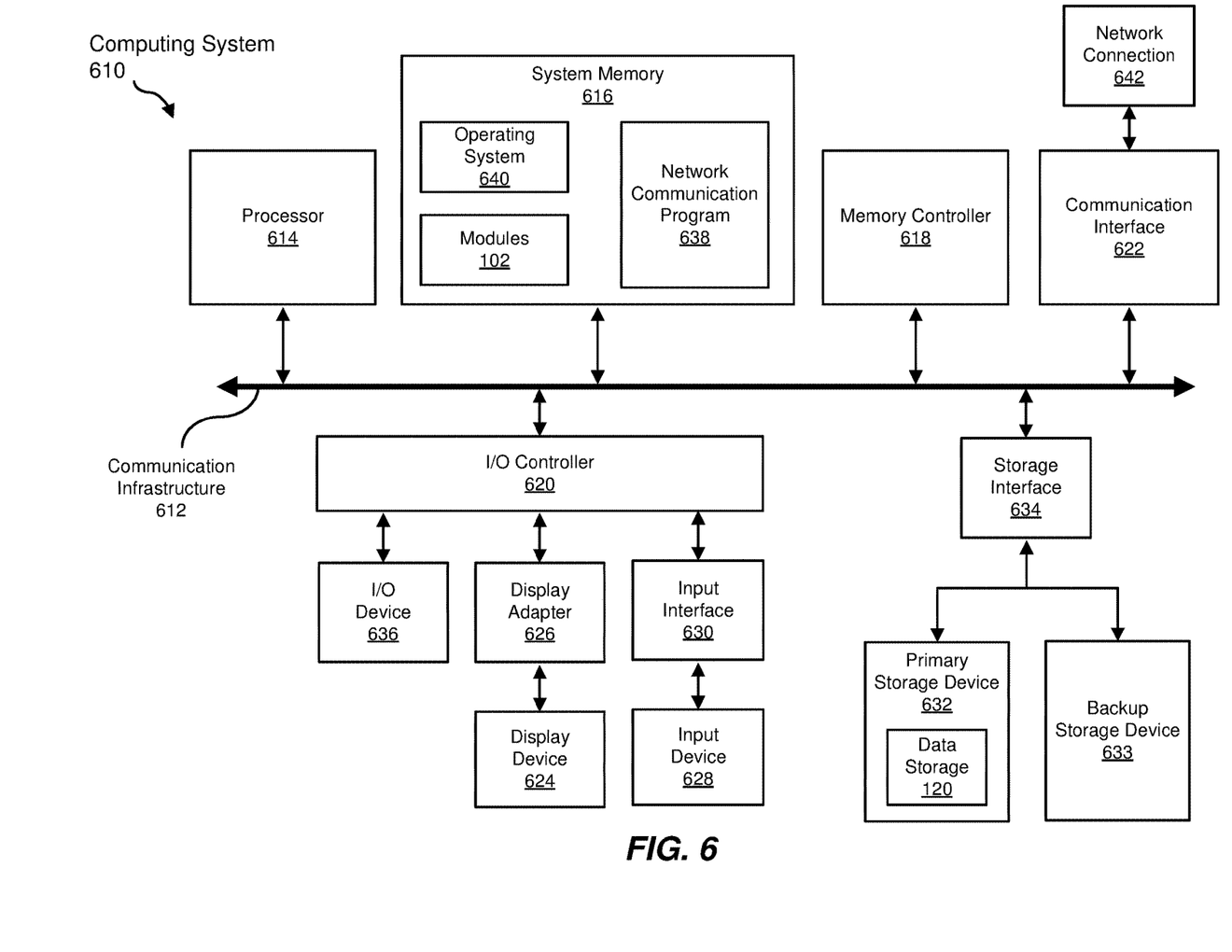
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
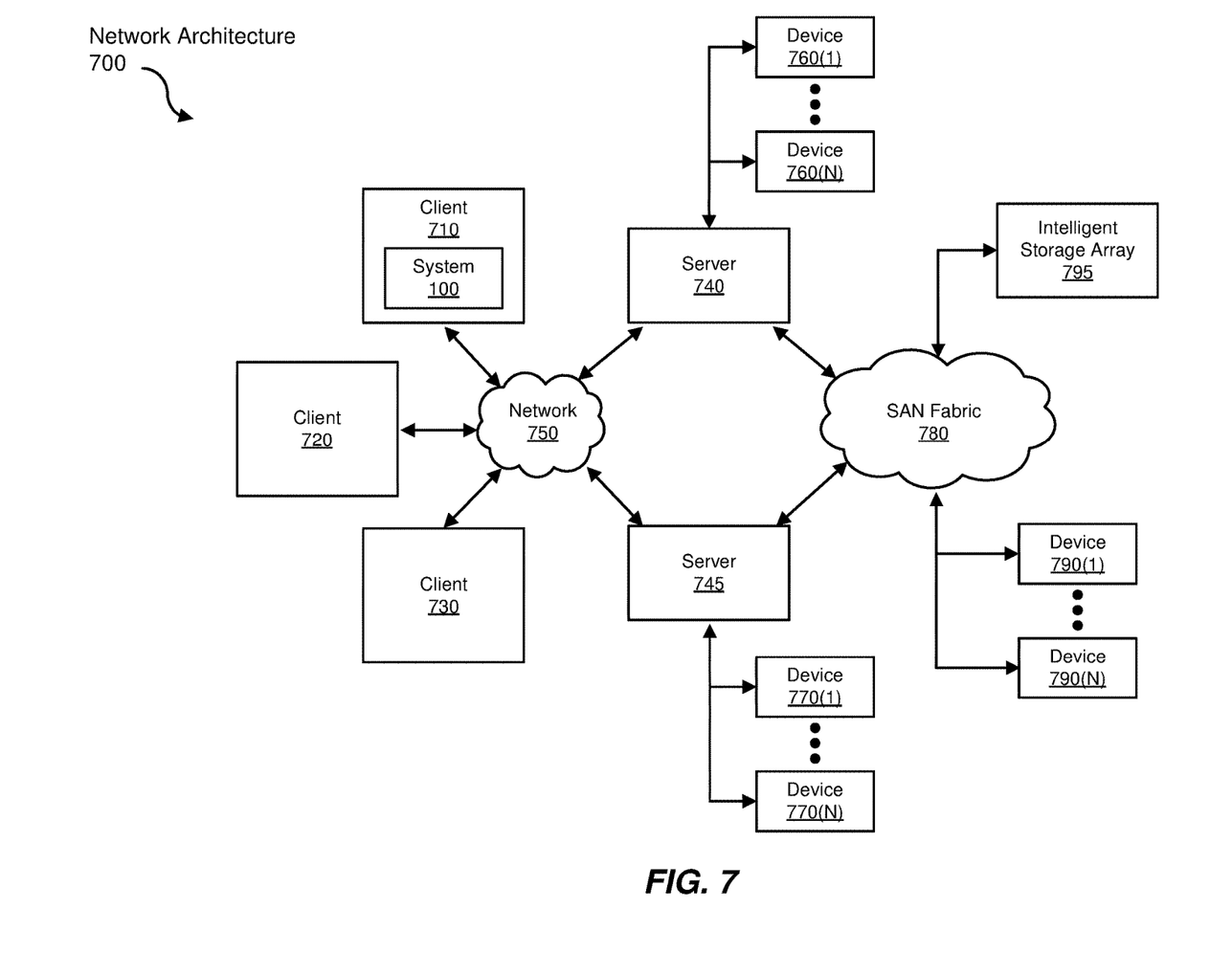
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enforcing secure shared access on computing devices by content state pinning.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing secure shared access on computing devices by content state pinning, at least a portion of the method being performed by a computing system comprising at least one processor, the method comprising:
   receiving, from a user, a selection of a content view to be shared with an additional user from content displayed on a computing device by an application;
   associating, by the computing device, a change event with the content view, wherein the change event comprises a windows content change event service generated by a mobile device operating system on the computing device for detecting one or more actions made by the additional user when the content view is being shared with the additional user;
   detecting, by the computing device, the change event in response to at least one of the actions made by the additional user to change the content view; and
   performing, by the computing device, a security action to protect the computing device from potentially malicious activity associated with the at least one of the actions made by the additional user to change the content view, wherein the potentially malicious activity comprises utilization of the application to compromise operation of the computing device.

2. The computer-implemented method of claim 1, wherein receiving, from the user, the selection of the content view to be shared with the additional user from content displayed on the computing device by the application comprises receiving the selection of the content view to be shared preceding a handover of the computing device from the user to the additional user.

3. The computer-implemented method of claim 1, wherein associating, by the computing device, the change event with the content view comprises associating the change event with the application displaying the content on the computing device.

4. The computer-implemented method of claim 1, wherein detecting, by the computing device, the change event in response to the at least one of the actions made by the additional user to change the content view comprises detecting an attempt to navigate away from the content view.

5. The computer-implemented method of claim 4, wherein detecting the attempt to navigate away from the content view comprises detecting a command to view additional content, outside of the content view, associated with the application.

6. The computer-implemented method of claim 4, wherein detecting the attempt to navigate away from the content view comprises detecting a command to access an additional application on the computing device.

7. The computer-implemented method of claim 1, wherein performing, by the computing device, the security action to protect the computing device from potentially malicious activity associated with the at least one of the actions made by the additional user to change the content view comprises:
   generating a security notification on the computing device; and
   requesting a security authorization to allow the at least one of the actions made by the additional user to change the content view.

8. A system for enforcing secure shared access on computing devices by content state pinning, the system comprising:
- a receiving module, stored in memory, that receives, from a user, a selection of a content view to be shared with an additional user from content displayed on a computing device by an application;
- an association module, stored in the memory, that associates a change event with the content view, wherein the change event comprises a windows content change event service generated by a mobile device operating system on the computing device for detecting one or more actions made by the additional user when the content view is being shared with the additional user;
- a detection module, stored in the memory, that detects the change event in response to at least one of the actions made by the additional user to change the content view;
- a security module, stored in the memory, that performs a security action to protect the computing device from potentially malicious activity associated with the at least one of the actions made by the additional user to change the content view, wherein the potentially malicious activity comprises utilization of the application to compromise operation of the computing device; and
- at least one physical processor that executes the receiving module, the association module, the detection module, and the security module.

9. The system of claim 8, wherein the receiving module receives, from the user, the selection of the content view to be shared with the additional user from content displayed on the computing device by the application, by receiving the selection of the content view to be shared preceding a handover of the computing device from the user to the additional user.

10. The system of claim 8, wherein the association module associates the change event with the content view by associating the change event with the application displaying the content on the computing device.

11. The system of claim 8, wherein the detection module detects the change event in response to the at least one of the actions made by the additional user to change the content view by detecting an attempt to navigate away from the content view.

12. The system of claim 11, wherein the detection module detects the attempt to navigate away from the content view by detecting a command to view additional content, outside of the content view, associated with the application.

13. The system of claim 11, wherein the detection module detects the attempt to navigate away from the content view by detecting a command to access an additional application on the computing device.

14. The system of claim 8, wherein the security module performs the security action to protect the computing device from potentially malicious activity associated with the at least one of the actions made by the additional user to change the content view by:
- generating a security notification on the computing device; and
- requesting a security authorization to allow the at least one of the actions made by the additional user to change the content view.

15. A non-transitory computer-readable medium comprising one or more computer-executable instructions that, when executed by at least one processor of a computing device, cause the computing device to:
- receive, from a user, a selection of a content view to be shared with an additional user from content displayed on the computing device by an application;
- associate a change event with the content view, wherein the change event comprises a windows content change event service generated by a mobile device operating system on the computing device for detecting one or more actions made by the additional user when the content view is being shared with the additional user;
- detect the change event in response to at least one of the actions made by the additional user to change the content view; and
- perform a security action to protect the computing device from potentially malicious activity associated with the at least one of the actions made by the additional user to change the content view, wherein the potentially malicious activity comprises utilization of the application to compromise operation of the computing device.

16. The non-transitory computer-readable medium of claim 15, wherein the one or more computer-executable instructions cause the computing device to receive, from the user, the selection of the content view to be shared with the additional user from content displayed on the computing device by the application by receiving the selection of the content view to be shared preceding a handover of the computing device from the user to the additional user.

17. The non-transitory computer-readable medium of claim 15, wherein the one or more computer-executable instructions cause the computing device to associate the change event with the content view by associating the change event with the application displaying the content on the computing device.

18. The non-transitory computer-readable medium of claim 15, wherein the one or more computer-executable instructions cause the computing device to detect the change event in response to the at least one of the actions made by the additional user to change the content view by detecting an attempt to navigate away from the content view.

19. The non-transitory computer-readable medium of claim 18, wherein the one or more computer-executable instructions cause the computing device to detect the attempt to navigate away from the content view by detecting a command to view additional content, outside of the content view, associated with the application.

20. The non-transitory computer-readable medium of claim 18, wherein the one or more computer-executable instructions cause the computing device to detect the attempt to navigate away from the content view by detecting a command to access an additional application on the computing device.

* * * * *